No. 897,536. PATENTED SEPT. 1, 1908.
F. HOLDEN.
MERCURY METER.
APPLICATION FILED JAN. 30, 1907.

Witnesses
Irving E. Steers.
J. Ellis Glen

Inventor:
Frank Holden.
by Albert H. Davis
Atty.

UNITED STATES PATENT OFFICE.

FRANK HOLDEN, OF LONDON, ENGLAND, ASSIGNOR TO GENERAL ELECTRIC COMPANY, A CORPORATION OF NEW YORK.

MERCURY METER.

No. 897,536.  Specification of Letters Patent.  Patented Sept. 1, 1908.

Application filed January 30, 1907. Serial No. 354,789.

*To all whom it may concern:*

Be it known that I, FRANK HOLDEN, a citizen of the United States, residing at London, England, have invented certain new and useful Improvements in Mercury Meters, of which the following is a specification.

My invention relates to mercury meters of the type described in my former application, Serial No. 297,600, filed January 24, 1906.

The object of my present invention is to provide a modified form of meter, particularly adapted for use in connection with storage batteries to indicate the amount of charge and discharge; though my present invention is not limited to meters employed for this particular use.

The meter disclosed in my earlier application comprises a magnetic field, a mercury chamber within the field, current leads to the mercury, and a closed continuous duct having its ends opening into the mercury chamber; a portion of the duct being of capillary dimensions, so as to produce the proper retardation of the mercury flow, together with means for recording the amount of flow.

By my present invention I form a portion of the duct as an enlarged index tube, and place in the tube a piston or index adapted to be moved by a flow of mercury in the tube, and provide a scale adjacent the index. By suitably calibrating the scale the position of the index indicates directly the amount of current that has passed through the meter.

My invention further comprises means for adjusting the position of the index in the tube. For this purpose I provide a shunt duct around the index tube, and place in the shunt duct manually-operated means, such as a paddle-wheel, for producing a flow of mercury through the shunt duct, and consequently through the index tube, so as to adjust the position of the index.

Figure 1:
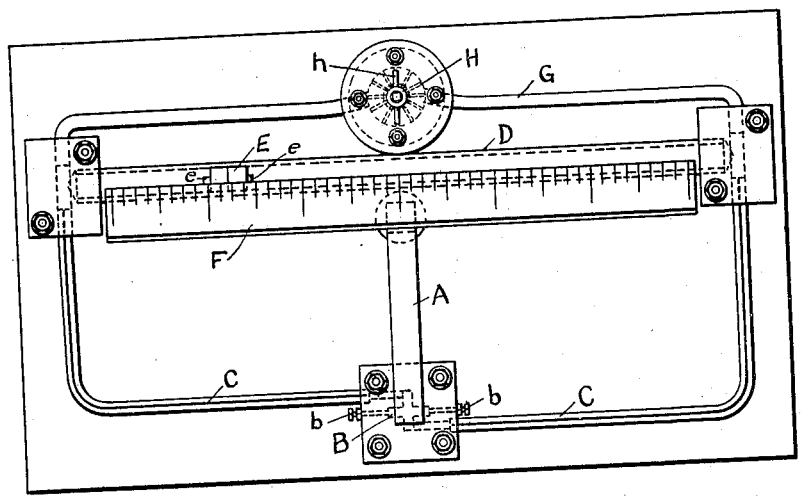
Figure 2:
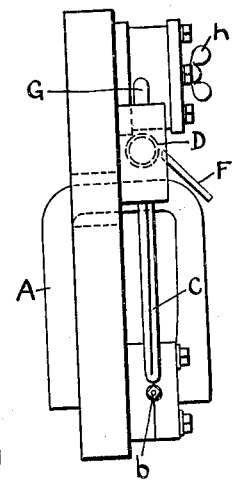
Figure 3:
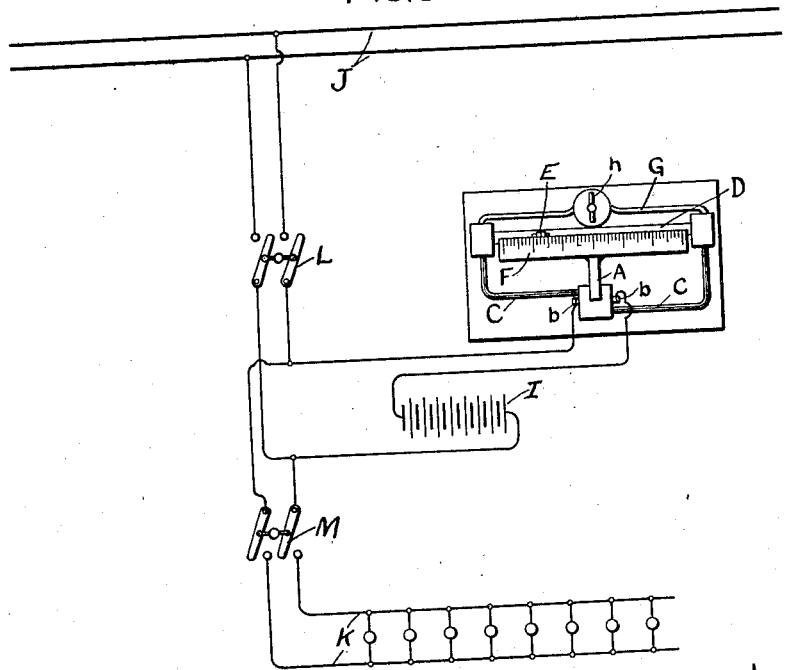

My invention will best be understood by reference to the accompanying drawing, in which Figure 1 shows a front elevation of a meter arranged in accordance with my invention; Fig. 2 shows a side elevation of the same; and Fig. 3 shows the arrangement of the meter for use in connection with a storage battery.

In the drawings, A represents a magnet which, in the case of a Coulomb meter may be a permanent magnet, as shown, and which, in a wattmeter, would be provided with a potential winding. The poles of this magnet are brought close to a cruciform mercury chamber B, shown in dotted lines in Fig. 1, and leads $b$ $b$ are brought into this chamber, so that current may pass through the mercury between the poles of the magnet.

C C represent capillary tubes, which open into the mercury chamber, as shown, and which, with the parts of the meter hereafter to be described, form a continuous closed duct for the flow of the mercury.

The meter, as thus far described, is the same as that disclosed in my earlier application.

D represents an enlarged horizontal tube, which opens into the capillary tubes C C and forms what I term the index tube of the meter. In this tube is mounted a piston or index E. This is preferably a hollow cylinder, which may be of iron or ivory, or any other substance not wetted by mercury, which fits within the tube D, and prevents the flow of mercury past it, but which can be moved readily in the tube by the pressure of mercury on either side. This cylinder has small hollow cylinders $e$ $e$ on each end, so as to enable the mercury to float the index so as to reduce its friction on the inner walls of the tube. The index is provided with a central line by means of which, together with the marks on the scale F mounted adjacent the tube D, the position of the index in the tube may be accurately read. The position of the index shows the amount of mercury flow, and consequently the amount of current that has passed through the meter.

In order to adjust the position of the index E in the index tube, I provide a duct G, shunting the index tube, and place in this duct a paddle-wheel H, the shaft of which projects through its casing and carries a small handle $h$, by means of which the paddle-wheel may be rotated by hand. The rotation of the paddle-wheel produces a flow of mercury in the shunt duct G, and consequently in the index tube D; thereby shifting the index E in one direction or the other, according to the direction of rotation of the paddle-wheel.

In Fig. 3, I have shown the connections of the meter when used with a storage battery to indicate the amount of charge and discharge. In this figure I represents the storage battery, J the mains from which the battery is charged, and K the consumption circuit. L and M represent switches for connecting the battery to the charging mains and to the consumption circuit, respectively. The mercury chamber is placed in series with the battery I by means of the leads $b\ b$, so that current flows through the meter, both when the battery is charging and discharging; but the current is in one direction for charging and in the opposite direction for discharging. Thus, when the switch L is closed for charging the battery, the charging current flowing through the meter produces a movement of the index E in one direction or the other. The total displacement of the index will represent the amount of charging current. When the switch L is opened and the switch M closed, the current supplied from the battery to the translating devices in circuit K flows through the meter in the opposite direction; returning the index toward its original position. The displacement of the index in this direction indicates the amount of current supplied by the battery.

I do not desire to limit myself to the particular construction and arrangement of parts here shown, but aim in the appended claims to cover all modifications which are within the scope of my invention.

What I claim as new and desire to secure by Letters Patent of the United States, is,—

1. In a mercury meter, a magnet, a mercury-containing chamber within the field of said magnet, current leads to the mercury in said chamber, a continuous closed duct having its ends opening into said chamber, an index in said tube adapted to be moved by a flow of mercury therein, and manually-controlled means for adjusting the position of said index in the tube.

2. In a mercury meter, a magnet, a mercury-containing chamber within the field of said magnet, current leads to the mercury in said chamber, a continuous closed duct having its ends opening into said chamber, a portion of said duct forming an index tube, an index in said tube adapted to be moved by a flow of mercury therein, and manually-controlled means for producing a flow of mercury in said tube.

3. In a mercury meter, a magnet, a mercury-containing chamber within the field of said magnet, current leads to the mercury in said chamber, a continuous closed duct having its ends opening into said chamber, a portion of said duct forming an index tube, an index in said tube adapted to be moved by a flow of mercury therein, a duct shunting said index tube, and manually-controlled means in the shunt duct for producing a flow of mercury therein.

4. In a mercury meter, a magnet, a mercury-containing chamber within the field of said magnet, current leads to the mercury in said chamber, a continuous closed duct having its ends opening into said chamber, a portion of said duct forming an index tube, an index in said tube adapted to be moved by a flow of mercury therein, a duct shunting said index tube, and a paddle-wheel mounted therein.

5. In a mercury meter, a magnet, a mercury-containing chamber within the field of said magnet, current leads to the mercury in said chamber, a continuous closed duct having its ends opening into said chamber, a portion of said duct being capillary and another portion enlarged, an index in the enlarged portion adapted to be moved by a flow of mercury therein, and manually-controlled means for adjusting the position of said index.

In witness whereof, I have hereunto set my hand this 16th day of January, 1907.

FRANK HOLDEN

Witnesses:
H. D. JAMESON,
F. L. RAND.